UNITED STATES PATENT OFFICE.

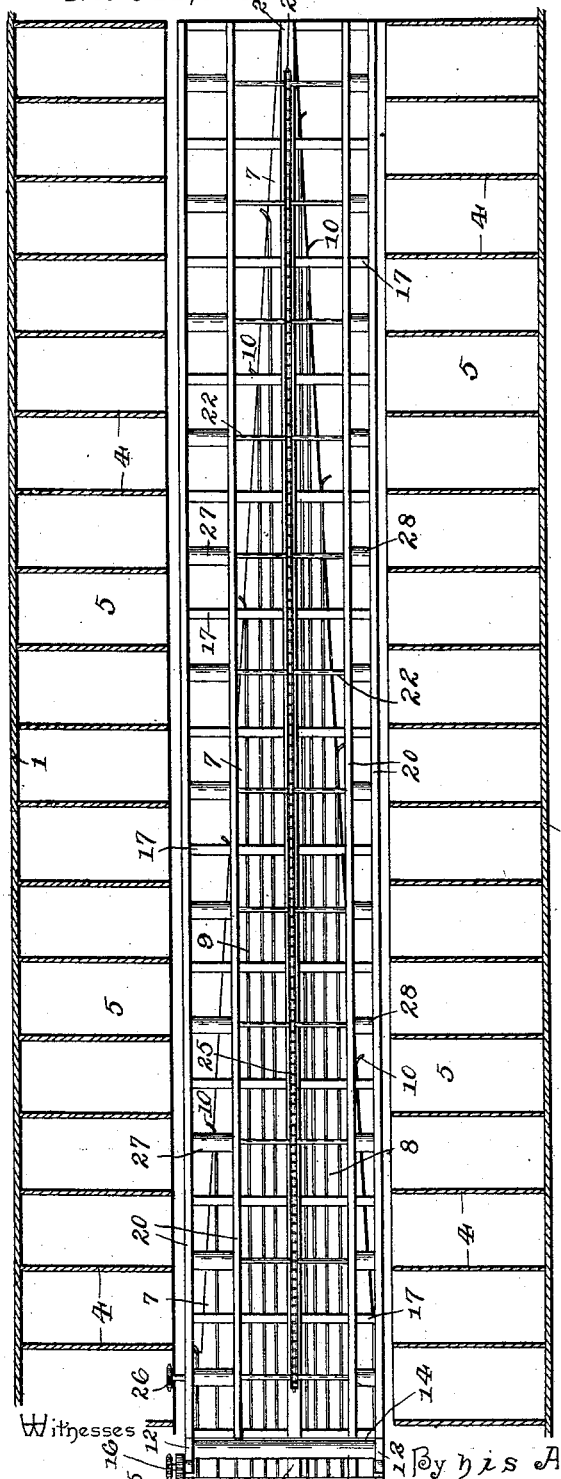

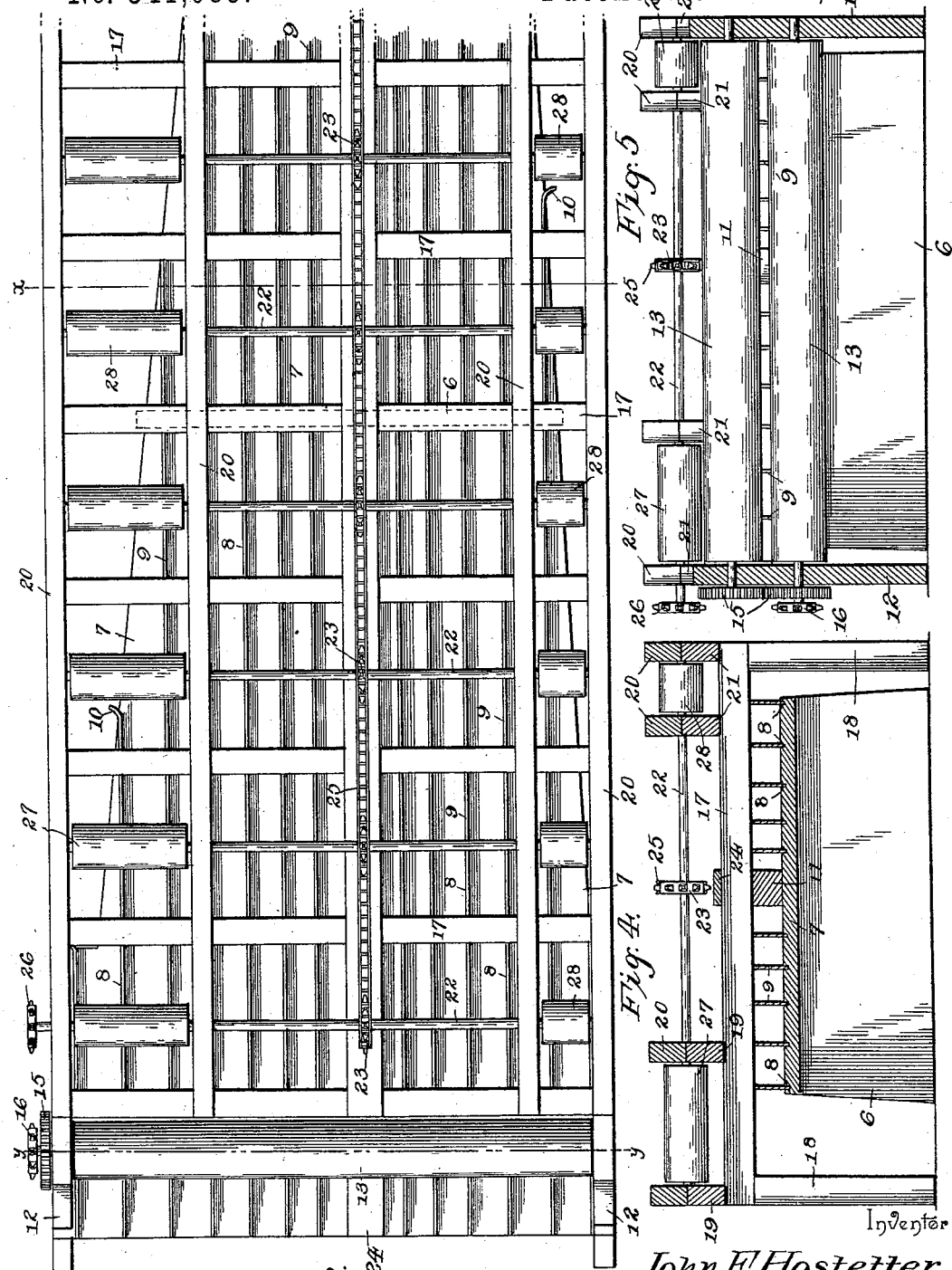

JOHN F. HOSTETTER, OF SUFFOLK, VIRGINIA.

TIMBER AND LUMBER CONVEYER.

SPECIFICATION forming part of Letters Patent No. 541,089, dated June 18, 1895.

Application filed January 16, 1895. Serial No. 535,141. (No model.)

*To all whom it may concern:*

Be it known that I, JOHN F. HOSTETTER, a citizen of the United States, residing at Suffolk, in the county of Nansemond and State of Virginia, have invented a new and useful Timber and Lumber Conveyer, of which the following is a specification.

This invention relates to an improvement in that class of timber and lumber conveyers which are designed to convey the lumber from the saw or ripper, and at the same time, to sort the same or to divide it into classes according to the dimensions of the planks or boards produced by the saw or ripper. These devices usually consist in a carrier or equivalent device provided with suitable rollers and guides whereby the lumber may be, when placed upon them, carried to distant points, and the guides are so arranged that the lumber of various dimensions will be separated and deposited in independent places. My invention embodies this broad principle and certain subordinate features which will appear hereinafter.

The principal or main object of the invention is to provide a conveyer which will have means for advancing and for sorting the lumber, and which will also have a separate conveyer whereby the lumber may be conducted away from the saw or ripper without contact with the sorting devices.

A further object and one subordinate to the main object, is to improve the power transmitting mechanism, and to provide a conveyer in which this mechanism will operate with more efficiency than heretofore and by which the advancement or conveyance of the lumber will be insured.

To these ends the invention consists in a conveyer having suitable supports above the level of the ground, and provided with sorting ways or chutes in which the lumber may be placed and sorted, as explained, and in locating above said sorting ways and chutes a conveyer proper, by which such lumber, as is desired, may be carried away from the saw independently of the sorting devices.

The invention also consists in various details of construction, and subcombinations which run through the entire structure, and which will be fully described hereinafter.

My improved conveyer and sorter is arranged within a shed or house, and extends centrally and longitudinally therewith; the shed being an elongated arrangement, as is common in the art of lumber making. At each side of the conveyer and sorter, and in the shed various chambers or ante-rooms are formed in which the lumber as sorted may be placed, and these may be merely devices attending and permitting the storage of the lumber, or they may be dry-kilns for curing the lumber, all of which will be understood, and which has no particular reference to the essential portions of my invention.

In the drawings my invention is fully illustrated, wherein—

Figure 1 represents a reduced plan view illustrating the general embodiment of the conveyer and sorter and also its relation to and the structure of the shed in which it is arranged. Fig. 2 is also a reduced view and illustrates a cross-section of the shed and my invention therein. Fig. 3 is an enlarged plan view of a portion of a conveyer and sorter embodying the essential features of my invention. Fig. 4 is a cross-section thereof, taken on the same scale and upon the line $x\ x$ of Fig. 3. Fig. 5 is also a cross-section on the line $y\ y$ of the same figure. Fig. 6 is a side elevation of a portion of my invention.

The shed in which my improvement is arranged comprises outer side walls 1, supporting the roof 2, which is provided with a centrally and longitudinally elongated ventilated dome 3, all of which is common in the art of building.

4 indicates a series of partitions, which extend transversely, or at right angles to the longitudinal line of the shed and form lumber compartments or boxes 5, provided for the reception of the sorted lumber, as explained hereinbefore. The compartments 5 extend inwardly for a distance slightly less than one third of the width of the shed, so as to leave between them and in the center of the shed a passage, extending longitudinally therewith. Within this passage way my improved conveyer and sorter is arranged.

6 indicates a series of supports, which may be of any number desired. These supports are provided for holding the supporting bed or floor 7 of the conveyer and sorter portion of my invention. This floor 7 tapers as it extends outwardly from the starting point or front end of the conveyer, which results in a corresponding decrease in the size of the supports 6. The floor 7 has formed therein a series of longitudinal surface grooves 8, which are of a number commensurate with the number of sorting sections with which the sorter is supplied. These grooves extend parallel with each other and longitudinally with the floor 7, so that they will run off from, or intersect with, the sides of the floor. This is so, owing to the fact, that the taper or decrease in the width of the floor causes them to extend past the sides thereof. Arranged with their edges within the grooves 8 and arising vertically from the floor 7 are the flanges or guides 9, which are one for each groove, and which form the ways or track within which the lumber to be sorted is placed. The outer ends of these flanges or guides, at the point where they intersect with the sides of the floor 7, are bent outwardly to form offset portions or wings 10, and so as to assist in the operation of expelling the lumber from the floor 7, as will appear hereinafter.

11 indicates a longitudinal beam, which is located on the floor 7. This beam takes the place of a central guide 9, and is commensurate with the full length of the floor 7; the width of the floor 7 at its outer end being equal to the width of the said beam. This beam operates to lend strength and rigidity to the floor 7, and also has a foundation for a super-structure hereinafter described.

The total number of the flanges or guides 9 is shown to be thirteen in the drawings, but it is obvious that this number may be varied at will, and to suit the convenience of the person using the appliance. It will also be seen by reference to the drawings, that the guides 9 are arranged at various distances from each other, so that they will form ways capable of receiving boards of varying widths, as is the object of this invention. Thus the two guides on the left hand side of the conveyer are shown to be farther apart than any other guides, and it will be assumed for example, that the guide way formed by these guides 9 is adapted for the reception of boards having a width of sixteen inches. Again, the guide immediately adjacent is a little nearer to the left hand side of the one just described, so as to form a guide way adapted to carry boards narrower than the first, say twelve or fourteen inches wide. Thus the widths of the several guide ways gradually decrease as they extend toward the center of the floor 7, or toward the beam 11, so that the broadest boards will be expelled near the inner or front end of the conveyer, while the narrowest boards will be carried down to the outer end thereof.

12 indicates two vertical standards, which are arranged at the inner end of the conveyer, and one at each side thereof; they being transversely rounded, and having journaled therein rollers 13. These rollers are two in number, and are arranged in a vertical line, so that they will be capable of operating as feed rollers for the lumber placed upon the floor 7, and so that their peripheries will meet in a plane commensurate with a plane of the upper surface of the floor aforesaid. To this end, the floor 7 is provided at a point adjacent to the rollers 13 with a transverse slot in which the lower roller 13 is arranged, and which permits the upper side of said roller to project through the space occupied by the floor 7 and extend slightly above the upper surface thereof.

The left hand trunnions of the rollers 13 are extended beyond the adjacent standards 12, and are there provided with meshing gears 15, whereby the motion of one roller is transmitted to the other and the two made to operate in unison. The extended trunnion of the lower roller is also provided with a sprocket wheel 16, over which a drive chain operates, and whereby power for operating the rollers is imparted thereto. Thus it will be seen, that as the boards are placed upon the floor 7, and within their respective guide ways, they will be forced to pass between the rollers 13, and will be caught thereby and advanced along the floor 7 and toward the outer end thereof. It will also be seen that the direct influence of the rollers 13 upon the boards will not last after the boards have been passed through them, and the advancement of the said boards effected by subsequent boards which may be placed upon the floor, and which will engage with the first boards, and by an indirect application of the power derived from the rollers 13, will be advanced as is necessary to the operation of my arrangement.

Rigidly secured by a bolt or otherwise to the longitudinal beam 11 are transversing, extending and parallel cross beams or ties 17, which are arranged at equal distances from each other and which extend throughout the length of the floor 7.

18 indicates a series of uprising supports which are mounted upon the floor or ground of the shed, and which extend upwardly to the outer end of some of the cross beams 17, whereby said beams or ties are supported and made rigid in their arrangement.

19 and 21 indicate four rails which are arranged in two parallel pairs, one pair being designated by the numeral 19, and one by the numeral 21. The pair 19 extend down the left hand side of the carrier, and are mounted upon the corresponding ends of the cross beams or ties 17, while the pair 21 extend down the opposite side of the conveyer, and are also affixed to the cross beams or ties 17. The distance between the rails of the pair 21 is less than the distance between the rails 19, and each of the rails 19 and 21 have arranged above them and extending parallel therewith the rails 20 which are rigidly secured to their respective beams 19 and 21, and which form bearings of the transverse shafts 22. The shafts 22 extend throughout the length of the carrier, and are arranged at equally distant points, their number being about equal to the number of beams or ties 17. Fixed to the shafts 22 are sprocket wheels 23, which are one for each shaft, and which are longitudinally elongated, they being arranged over the beam 11.

24 indicates a strip of timber which is extended longitudinally the entire length of the carrier, and which is rigidly secured to the upper sides of the cross beams or ties 17, and directly under the sprocket wheels 23.

Operating over the sprocket wheels 23 is a chain 25 which meshes with each wheel, and which is driven by the shaft at the inner extremity of the carrier, said shaft having one end extended beyond the left hand side of the carrier, and provided with a sprocket wheel 26. This sprocket wheel 26 may be connected directly with the source of power, or indirectly through the medium of the sprocket wheel 16, of prior description.

27 and 28 respectively indicate a series of rollers, which are fixed to the tranverse shafts 22, and which are arranged within the space between the rails 19 and 21. The rollers 27 are the longer rollers, and are located between the rails 19, while the rollers 28 are much shorter than the rollers 27, and are arranged between the rails 21. These rollers 27 and 28 form the carrier referred to hereinbefore, and that means by which the timber may be conveyed from one end of the shed to the other without contact with the sorting mechanism.

The use of my invention will not require any detailed description since it will be understood from the drawings. It will be sufficient for me to say, therefore, that the inner end of the carrier, or that end at which the rollers 13 are arranged, will be located adjacent to the saw or ripper by which the boards are formed, and that as soon as they have been operated upon by such machine, they should be placed upon the carrier by an attendant. If the boards be such as it is desired to store away within the boxes or compartments 5, they should be placed upon the floor 7 and within the proper guide ways thereof. Along these guide ways they will be pushed, as has been previously explained, and they will be dropped out adjacent to those boxes or compartments which are designed for their reception. On the other hand, if it is not desired to store the planks in any of these boxes or compartments, but convey them to the opposite end of the shed, they may be placed upon the rollers 27 or 28, according to the widths of the boards, whereupon they will be carried to the outer end of the carrier and dropped upon the floor of the shed.

It will be understood, that wagons or cars may be loaded directly over the carrier, either at the sides thereof where the sorted boards are delivered, or at the ends where the boards pass down the carriers of the rollers 27 and 28. The boards which are delivered over the sides of the carrier, or the sorted boards fall upon the floor of the shed, from which they may be picked up and placed within the boxes or compartments 5 by attendants, all of which will be understood.

Changes in the form, proportion, and the minor details of construction may be resorted to without departing from the principle or sacrificing any of the advantages of this invention.

Having thus described my invention, what I claim is—

1. The combination of a floor, tapering uniformly, a series of longitudinal guide ways on said floor, the guide ways being extended longitudinally and parallel with each other so that they will intersect with the sides of the tapering floor, and terminate at various points throughout the length of said sides, and means operating with the guide ways whereby the timber may be forced along the same, substantially as described.

2. A timber and lumber conveyer consisting of a floor, tapering uniformly from one end to the other, and having in its upper sides a series of surface grooves extending longitudinally with the floor and parallel with each other, a series of guide strips, having their edges arranged within the said grooves, and extending vertically over the surface of the floor, so as to form guide ways, the same being intersected with tapering sides of the floor so as to terminate at various points throughout the length of said sides, substantially as described.

3. The combination of a floor, a series of guide ways of different lengths arranged thereon and terminating at different points, and a pair of feed rollers operating at one end of the floor and capable of forcing the timber down the said guide ways, one of said feed rollers being located above the plane of the floor, while the remaining feed roller is located below the same, and has its upper side extended through a transverse slot in the floor, substantially as described.

4. The combination of four parallel rails arranged in two pairs spaced unequal distances apart, four additional rails mounted upon the respective parallel rails, transverse shafts extending past each rail and at right angles to the same, and journaled between the first rails and those which are arranged upon them, carrying rollers fixed to the shafts between each pair of rails and arranged in two series, the rollers of one series being longer than those of the other series, a sprocket wheel fixed to each shaft, and a drive sprocket chain operating over the wheels, substantially as described.

5. A timber and lumber conveyer and sorter comprising in its construction a floor, a series of sorting guide ways thereon, a pair of feed rollers for moving the lumber through the guide ways, a beam extending longitudinally and centrally on the floor, a series of cross beams or ties superposed above the guideways and mounted upon said longitudinal beam and rigidly secured thereto at right-angles to it, four longitudinal rails mounted upon the cross beams or ties and arranged in two pairs, a series of shafts revolubly mounted on the rails, carrying rollers fixed upon the shafts and between each pair of rails, sprocket wheels fixed to the shafts, and a drive sprocket chain operating over the wheels, substantially as described.

6. In a timber and lumber conveyer and sorter, a series of guide-ways or chutes of varying capacity, said guide-ways being of various lengths and terminating at different points for conveying the timber or lumber to points at various distances from the point of feed, in combination with means operating in conjunction therewith for feeding the timber or lumber along the same, substantially as specified.

In testimony that I claim the foregoing as my own I have hereto affixed my signature in the presence of two witnesses.

JOHN F. HOSTETTER.

Witnesses:
   H. WOODWARD,
   W. C. WYATT.